United States Patent [19]

Mihailov

[11] Patent Number: 4,726,418

[45] Date of Patent: Feb. 23, 1988

[54] VACUUM CONDENSOR WITH CONDENSATE TRAP

[75] Inventor: Mihail V. Mihailov, Sofia, Bulgaria

[73] Assignee: Kombinat "Korabostroene", Varna, Bulgaria

[21] Appl. No.: 935,858

[22] Filed: Nov. 26, 1986

[51] Int. Cl.⁴ ............................................. F28B 9/08
[52] U.S. Cl. ................................... 165/113; 165/114
[58] Field of Search ...................... 165/113, 114, 913

[56] References Cited

U.S. PATENT DOCUMENTS

| | | | |
|---|---|---|---|
| 2,619,453 | 11/1952 | Andersen | 165/113 X |
| 2,830,797 | 4/1958 | Garland | 165/113 X |
| 3,094,165 | 6/1963 | Droescher | 165/113 |
| 3,538,983 | 11/1970 | Thomae | 165/113 |
| 4,220,194 | 9/1980 | Shade, Jr. et al. | 165/113 X |
| 4,249,596 | 2/1981 | Tutak et al. | 165/113 |
| 4,558,734 | 12/1985 | Wolfseder | 165/113 |

*Primary Examiner*—William R. Cline
*Assistant Examiner*—Sue Hagarman
*Attorney, Agent, or Firm*—Karl F. Ross; Herbert Dubno

[57] ABSTRACT

A vacuum condensor with a condensate trap consisting of a horizontal cylindrical housing with a neck has two bottoms which are closed by covers, and inside the housing there are mounted heat-exchange bodies. Externally of the housing there are connected a deaeration device and a condensate pump. The heat-exchange bodies can be either pipes or plates.

1 Claim, 9 Drawing Figures

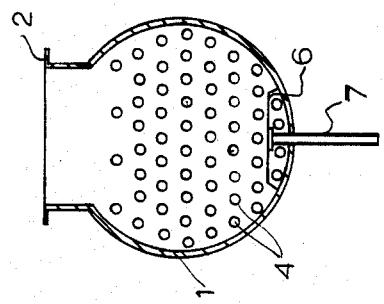
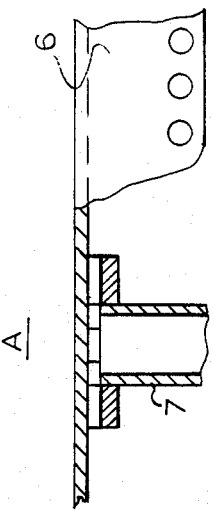
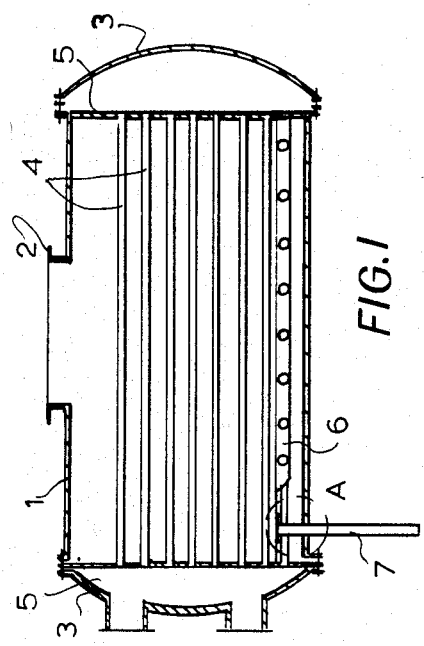
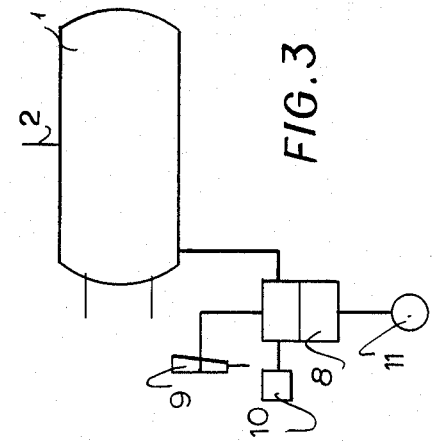

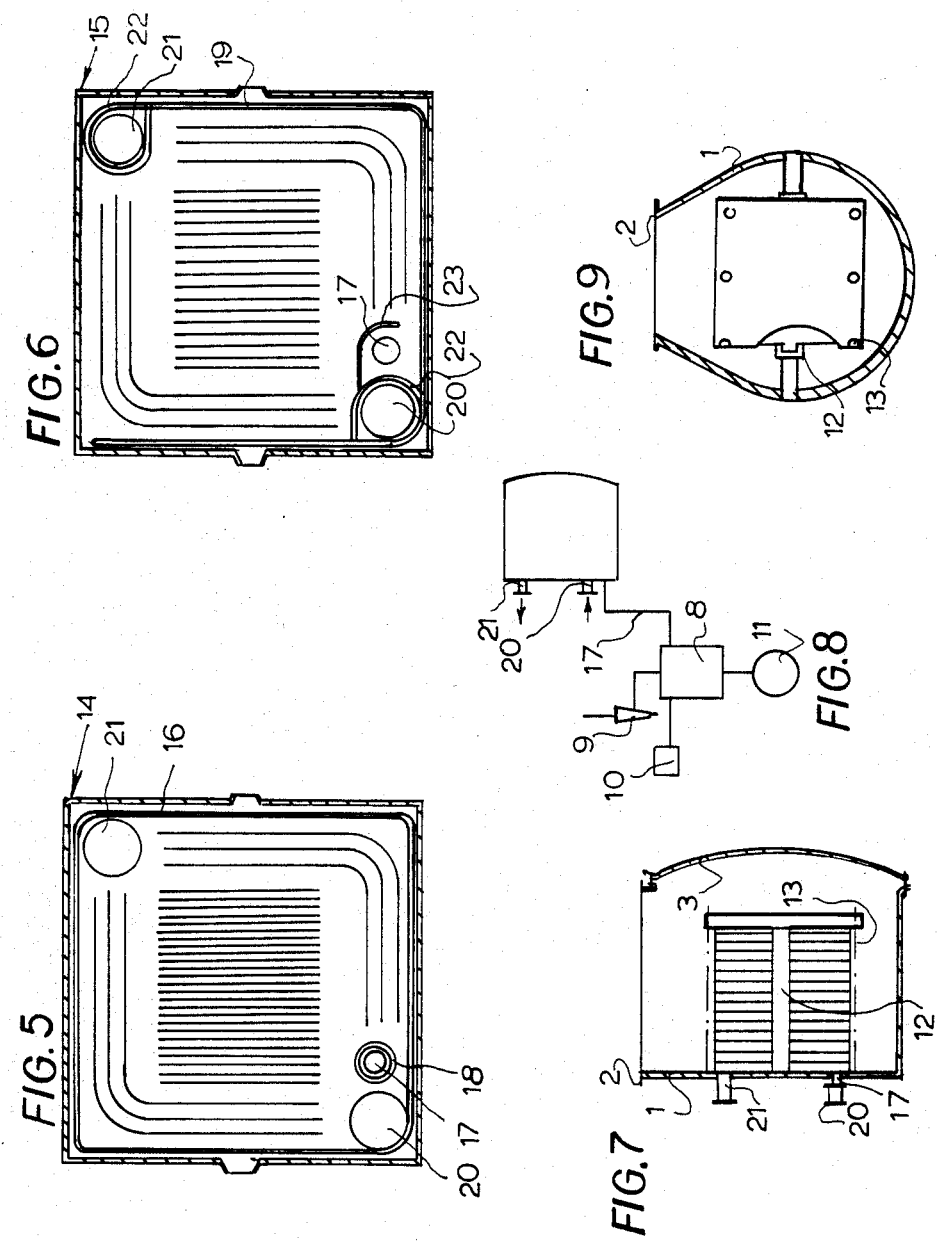

VACUUM CONDENSOR WITH CONDENSATE TRAP

FIELD OF THE INVENTION

This invention relates to a vacuum condensor with a condensate trap for vapors and which is useful in installations where vacuum condensors are used, more particularly, in the chemical industry.

BACKGROUND OF THE INVENTION

A known vacuum pipe-type condensor comprises a housing with a neck forming a vapor inlet, and two pipe grates, fastened to the housing and, in the holes of which the pipes are fastened. A deaeration device is connected on both sides of the housing below the horizontal diametral plane. The vapors enter through the neck into the space between the pipes, while the cooling liquid is supplied through the bottom half of the front cover, passes through the lower row of pipes, through the rear space, enters the upper layer of pipes, and leaves the condensor through the top half of the front cover in the case of a two-pass condensor. The condensate is collected in the bottom portion of the housing and is pumped out by a condensate pump.

Another known vacuum plate-type condensor comprises a housing with a neck, in which there is mounted a stack of consecutively alternating plates, for water and vapor spaces, of the same configuration, but with different gaskets. The plates for the water space have a gasket surrounding the entire plate to avoid any leakage of cooling liquid from the stack, and a gasket is provided around the hole for the outflow of condensate. The plates of the vapor space have a gasket surrounding the entire plate except for the top edge, which serves for the inflow of vapor, and two additional gaskets around the holes for the cooling liquid. The condensate is pumped out by a condensate pump through the holes of the plates for condensate. The deaeration device applies suction to the same hole.

These known condensors have the following drawbacks: an irregular thermal loading of the pipes and the plates along their length and array; a loss of vapor via the deaeration device, for trapping of which additional devices are required; the deaeration device must be of design and consume a large amount of energy.

OBJECT OF THE INVENTION

It is, therefore, a general object of this invention to develop a vacuum condensor with a condensate trap for the vapors produced by means of which irregular thermal loading of the pipes and the plates can be reduced, loss of condensate via the deaeration device can be halted, the design of the deaeration device can be simplified, and the energy consumed by the latter can be reduced.

SUMMARY OF THE INVENTION

This object is achieved with a vacuum condensor with a condensate trap comprising a horizontal cylindrical housing with a neck; the both (ends) of which are closed by covers, and inside the housing the two bottoms of the housing are closed by covers. Inside the housing there are connected a deaeration device and a condensate pump. According to the invention, the heat-exchange bodies are pipes arranged alongside the housing and fastened to it by means of two pipe plates, and over the lowest pipe row there is mounted a diaphragm perforated at its bottom end, to which there is fastened an overflow pipe. The other end of the overflow pipe is attached to a condensate vessel, which is connected in its top part with a deaeration device and a vacuum-regulator, and in its bottom part—condensate pump.

In a design variant of the condensor, the heat-exchange bodies represent a stack of consecutively alternating plates for the water and the vapor spaces, fastened to the one bottom of the housing by means of bars and stud bolts with respective gaskets. The plates for the vapor space are provided with a barrier gate over the hole of the outlet for condensate. The outlet for condensate is attached to a condensate vessel, which is connected in its upper portion with a deaeration device and a vacuum-regulator, and at its bottom portion—with a condensate pump.

The advantages of the device according to the invention are as follows: the irregularity of the thermal loading of the pipes and the plates is reduced; the losses of condensate via the deaerating device are eliminated; the design of the deaeration device is simplified and the energy consumed by it is reduced; and the overcooling of the condensate is avoided.

BRIEF DESCRIPTION OF THE DRAWING

For a better understanding of the invention, reference should be made to the accompanying diagrammatic drawing in which there is illustrated a preferred embodiment of the invention. In the drawing:

FIG. 1 is a longitudinal sectional view of a vacuum condensor with pipes;

FIG. 2 is a cross-sectional view of the vacuum condensor with pipes;

FIG. 3 is a diagram showing the connection of the components of the vacuum condensor with pipes;

FIG. 4 shows the detail A in FIG. 1;

FIG. 5 is a cross-sectional view of a vacuum condensor with plates for the water space;

FIG. 6 is a cross-sectional view of a vacuum condensor with plates for the vapour space;

FIG. 7 is a longitudinal sectional view of a vacuum condensor with plates;

FIG. 8 is a diagram showing the connection of the components of a vacuum condensor with plates; and FIG. 9 is an outside view of the vacuum condensor with plates as seen from the side of the cover.

SPECIFIC DESCRIPTION

The vacuum condensor with a condensate trap of the invention consists of a horizontal cylindrical housing 1 with neck 2, the both bottoms of which are closed by covers 3. Inside the housing 1 there are mounted heat-exchange bodies, in the form of pipes 4, disposed alongside the housing 1 and fastened to it by means of two pipe plates or tube sheets 5. Over the lowest row of pipes 4 there is mounted a diaphragm 6 which is perforated in its bottom end, and to it there is fastened an overflow pipe 7 (outlet for the condensate) which is provided with slots immediately underneath the diaphragm 6. The other end of the overflow pipe 7 is attached to a condensate vessel 8. The top portion of the condensate vessel 8 is connected to the suction side of the deaeration device 9 and to the vacuum-regulator 10. The bottom portion of the condensate vessel 8 is connected to the condensate pump 11.

In a design variant of the condensor, to one of the bottoms of housing 1 there is fastened a stack of consecutively alternating plates with flutes for the water 14 and the vapor 15 spaces. The plates 14 and 15 are of the same configuration, but they differ in the arrangement of the gaskets. Along the periphery of the plates for the water space 14 there is provided a gasket 16 which is closed an all sides, while around the outlet for condensate 17 there is mounted an O-ring 18. Along the periphery of the plates for the vapor space 15 there is provided a gasket 19 which is open in its top end; around the holes for inlet 20 and outlet 21 of cooling water there are mounted additional gaskets 22, while over the hole for outlet of the condensate 17 there is provided a barrier gate 23. The outlet for condensate 17 is connected with a condensate vessel 8.

The operation of the vacuum condensor with a condensate trap for the vapors is as follows:

In the case when pipes 4 are mounted in the housing 1, the cooling water is supplied in the bottom portion of the one cover 3, it passes through the bottom layer of pipes 4 and through the rear space enters the top layer of pipes 4, and leaves the housing 1 through the top portion of the same cover 3. The vapor which must be condensed enter the space between the pipes through the neck 2 and move towards the holes of diaphragm 6. On their path they come in contact with the pipes 4 and condense. The condensate passes through the holes of diaphragm 6 and flows via the overflow pipe 7 towards the condensate vessel 8, from where it is pumped out by means of the condensate pump 11. The vapor passing through the holes of diaphragm 6 sparge as small bubbles through the condensate trap, which is cooled to a temperature lower than the temperature of condensation of the vapor for the given pressure and condensate. The deaeration device 9 maintains the vacuum in the installation, as preset by the vacuum-regulator 10.

When plates 14 and 15 are mounted inside the housing 1, then the cooling water is supplied through the inlet 20, it passes through the water spaces and leaves the condensor through the outlet 21. The vapor pass through the neck 2 and through the top holes of the vapor spaces and condense on the plates. The condensate passes through the slot between the open gasket 19 and the barrier gate 23, and flows through the outlet for condensate 1 towards the condensate vessel 8, from where it is pumped out by the condensate pump 11. The vapors passing through the slot bubble through the condensate trap, which is cooled to a temperature lower than the temperature of condensation of the vapours for the given pressure, and condensate. The deaeration device 9 maintains the vacuum in the installation, which is preset by the vacuum regulator 10.

What is claimed is:

1. A vacuum condensor having a condensate trap, comprising:

a generally cylindrical housing closed at opposite ends with respective housing covers defining respective bottoms bottoms, a generally horizontal axis, and an upwardly converging neck receiving vapor to be condensed;

means in said housing forming a condensing surface and defining water passages subdivided horizontally into an upper section and a lower section, said sections communicating with one another;

a water inlet pipe opening through one of said covers and communicating with said lower section;

a water outlet pipe opening through said one of said covers and communicating with said upper section;

a condensate trap formed in said lower section and including at least one member having an imperforate horizontal surface located along a lower part of said lower section and open beneath said surface for collecting condensate formed by the circulation of water through said sections;

a condensate outlet having an opening below said condensate trap and located proximal to said one of said bottoms for discharging condensate from said housing;

a condensate vessel connected to said condensate outlet for collecting condensate;

a deaeration device connected to an upper part of said condensate vessel above a liquid level therein;

a vacuum regulator connected to said upper part of said vessel; and a condensate pump connected to a lower part of said condensate vessel, said condensing surface being formed by substantially horizontal pipes in said housing supported by tube sheets proximal to said bottoms, said pipes being subdivided into said sections, said imperforate horizontal surface being formed by a diaphragm extending the length of said housing between said tube sheets above a row of lower ones of said pipes therein, said diaphragm having downwardly turned edges formed with holes, said condensate outlet being a pipe communicating with a space below said diaphragm directly below the underside thereof.

* * * * *